INVENTOR
LUCIEN A. COUVILLON
BY Samuel Lindenberg
Abraham Wasserman
ATTORNEYS

INVENTOR
LUCIEN A. COUVILLON
BY Samuel Lindenberg
Abraham Wasserman
ATTORNEYS

Sept. 17, 1968 L. A. COUVILLON, JR 3,402,265

PSEUDONOISE (PN) SYNCHRONIZATION OF DATA SYSTEM WITH DERIVATION OF CLOCK FREQUENCY FROM RECEIVED SIGNAL FOR CLOCKING RECEIVER PN GENERATOR

Filed July 12, 1965 5 Sheets-Sheet 3

INVENTOR
LUCIEN A. COUVILLON
BY Samuel Lindenberg
Abraham Wasserman
ATTORNEYS

INVENTOR
LUCIEN A. COUVILLON
BY Samuel Lindenberg
Abraham Wasserman
ATTORNEYS

Sept. 17, 1968 L. A. COUVILLON, JR 3,402,265

PSEUDONOISE (PN) SYNCHRONIZATION OF DATA SYSTEM WITH DERIVATION OF CLOCK FREQUENCY FROM RECEIVED SIGNAL FOR CLOCKING RECEIVER PN GENERATOR

Filed July 12, 1965 5 Sheets-Sheet 5

INVENTOR
LUCIEN A. COUVILLON
BY Samuel Lindenberg
Abraham Wasserman
ATTORNEYS

United States Patent Office 3,402,265

Patented Sept. 17, 1968

3,402,265

PSEUDONOISE (PN) SYNCHRONIZATION OF DATA SYSTEM WITH DERIVATION OF CLOCK FREQUENCY FROM RECEIVED SIGNAL FOR CLOCKING RECEIVER PN GENERATOR

Lucien A. Couvillon, Jr., Los Angeles, Calif., assignor to California Institute Research Foundation, Pasadena, Calif., a corporation of California Filed July 12, 1965, Ser. No. 471,154
17 Claims. (Cl. 178—69.5)

The invention described herein was made in the performance of work under a NASA contract and is subject to the provisions of Section 305 of the National Aeronautics and Space Act of 1958, Public Law 85–568 (72 Stat. 435; 42 USC 2475).

This invention relates to a digital communication system and, more particularly, to improvements in a synchronized digital data communication system.

One of the newly developed techniques used in space communication systems for transmitting data such as binary signals between a space vehicle and a ground station is the coherent phase-shift-keying technique, hereafter referred to as the PSK technique. Basically, it consists of biphase modulating a subcarrier frequency by the binary data (i.e., the zeroes and ones) and transmitting a carrier phase modulated by this signal to a receiver, where coherent phase detection is employed to recover the subcarrier. Data detection is achieved by providing in the receiver a demodulation reference which is in synchronism with the unmodulated subcarrier in the transmitting system. The output of the phase detector is passed through a "matched filter," where the signal is integrated over a bit period. As a result, random noise components are averaged out, so that the probability of detecting the correct data transmitted is maximized.

Although the basic concepts of the coherent PSK technique are rather simple, it should be appreciated that the practical difficulties lie in obtaining in the receiver the necessary demodulation reference which has the exact phase of the unmodulated carrier, and synchronizing signals necessary to limit the integration period of the "matched filter" to exactly a bit period, in the absence of which the probability of correctly identifying the binary data is greatly reduced. To derive these synchronizing signals, a coherent PSK system generally utilizes some pilot tone technique wherein transmitted power is directed to a synchronizing tone or code. The codes generally possess special correlation properties through which synchronization may be uniquely and readily obtained. One code which has particularly advantageous correlation properties for synchronization purposes is a pseudorandom binary sequence, commonly called a pseudonoise (PN) code.

The use of this code to produce synchronizing signals in a communication system using coherent PSK techniques has been described in several publications including an article by Benn D. Martin, entitled, "The Mariner Planetary Communication System Design," published in 1961 by North-Holland Publishing Company, Amsterdam, Holland, as part of the Proceedings of the Second International Space and Science Symposium held in Florence, Italy, Apr. 10–14, 1961. Another publication is a Jet Propulsion Laboratory (Pasadena, Calif.), Technical Report No. 32–314, entitled, "Command Techniques for the Remote Control of Interplanetary Spacecraft," by J. C. Springett, published Aug. 1, 1962. A third publication is another Jet Propulsion Laboratory Technical Report 32–495, entitled, "Telemetry and Command Techniques for Planetary Spacecraft," by J. C. Springett, published Jan. 15, 1965.

As is appreciated, by those familiar with the art, in light of the aforementioned references, the correlation characteristics of the PN code are used in conjunction with a phase lock loop arrangement to synchronize the clocking of a PN generator in the ground receiver with the clocking of a PN generator in a space vehicle. Once synchronization is accomplished, synchronizing signals are decoded from the PN generator at the receiver in order to detect the binary data transmitted in the form of a biphased modulated carrier. Basically, synchronization is accomplished by cross correlating a PN code received from the spacecraft with a PN code produced by the PN generator in the receiver to produce an error voltage which is then used to control a voltage controlled oscillator (VCO) in the phase lock loop arrangement. However, in order for the prior art systems to operate properly, it is necessary for a highly trained operator to manually adjust the VCO of the phase locked loop until the degree of cross correlation between the two PN codes is high enough to enable the phase lock loop to synchronize the clocking of the ground PN generator with that in the space vehicle. In addition, the continuous adjustments made by the operator are very time consuming requiring up to several hours before synchronization of the clocking of the two PN generators is accomplished. Thus, the need of a trained operator and the length of time required for synchronizing prior art systems has been found to be most disadvantageous.

Accordingly, it is an object of the present invention to provide a novel system which overcomes the disadvantages of the prior art.

Another object of the invention is the provision of a novel system for automatically synchronizing the clocking of a pair of code generators.

A further object is to provide a system for automatically synchronizing a PN generator at a receiver with a PN generator in a space vehicle in order to produce necessary synchronizing signals for data detection.

These and other objects of the invention are achieved by providing a system in which the carrier which has been phase modulated is utilized in a quadratic detector to produce a clock frequency which is the same as the basic frequency from which the data carrier and the PN code clock in the space vehicle were derived. The clock frequency, which is related to the PN code generator clock in the space vehicle but of ambiguous phase, is used to clock the PN generator in the receiver. The two PN codes from the generators in the vehicle and the receiver are correlated to produce an error signal which is used to control the digital retard or advance of the clock phase of the local PN generator in the receiver until a maximum is detected. Such a maximum indicates that the two generators are clocked in synchronism, so that synchronizing pulses can be derived from the PN generator at the receiver to decode the binary data transmitted on the data carrier.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 2:
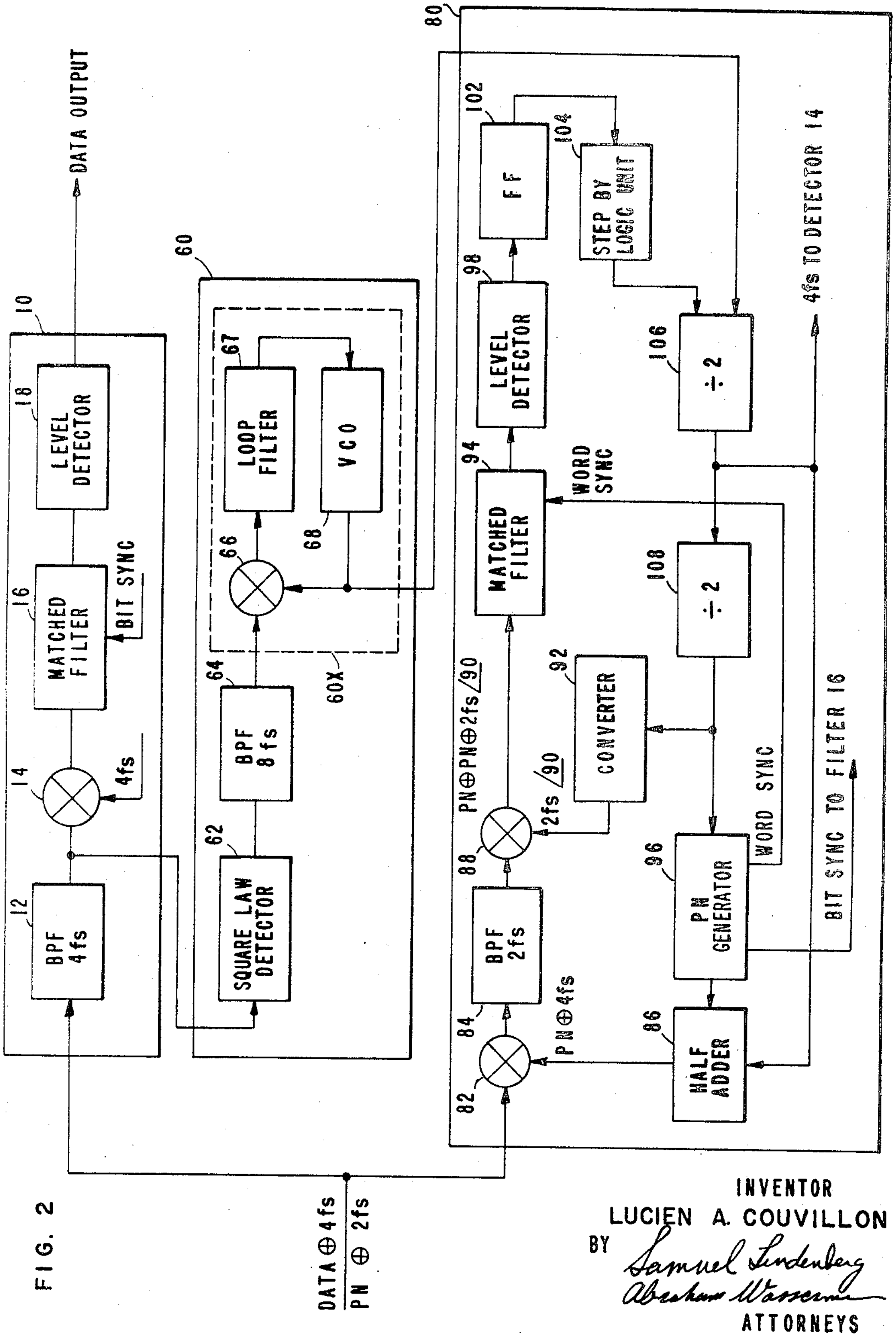
FIGURE 2 is a block diagram of the detection system of the present invention.
Figure 3:
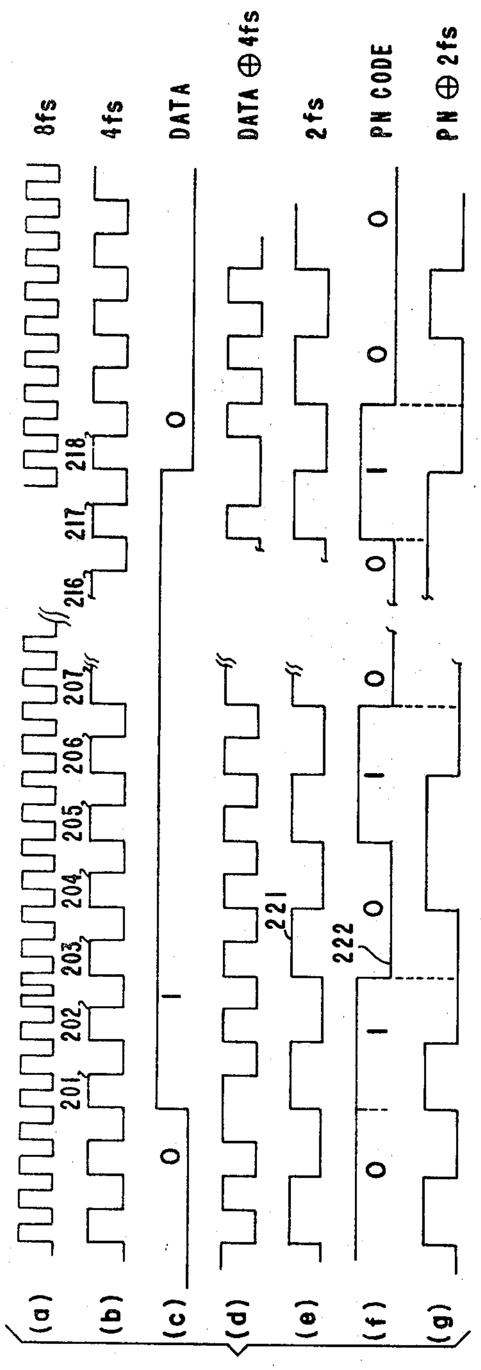
Figures 4A, 4B:
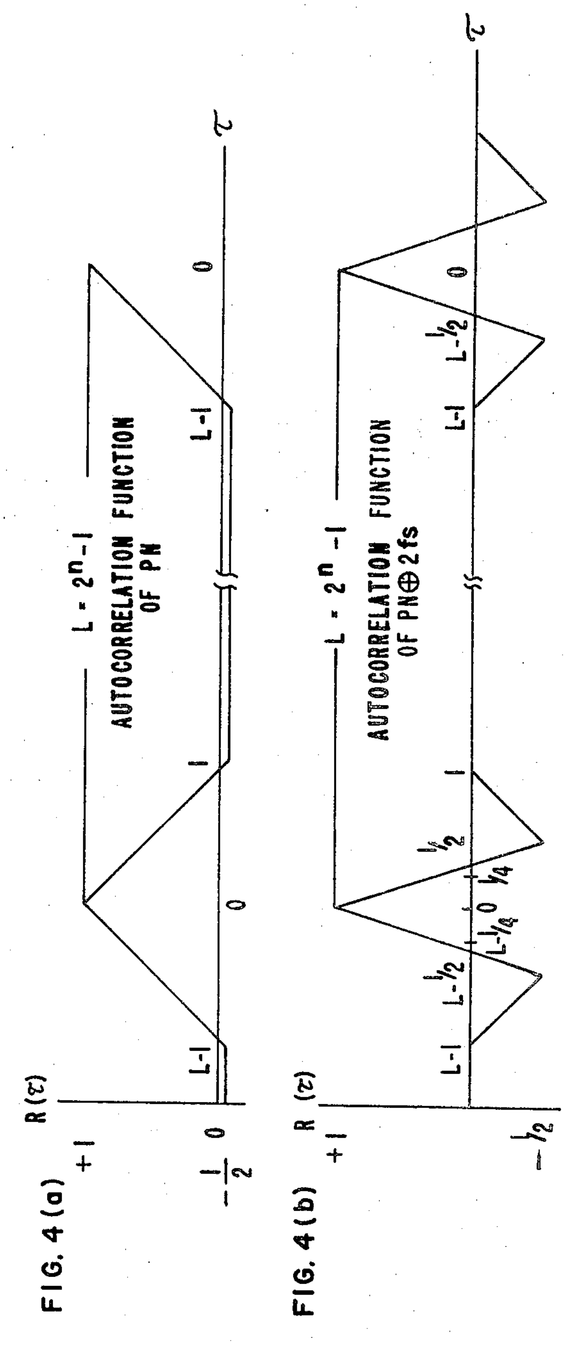
Figure 5:
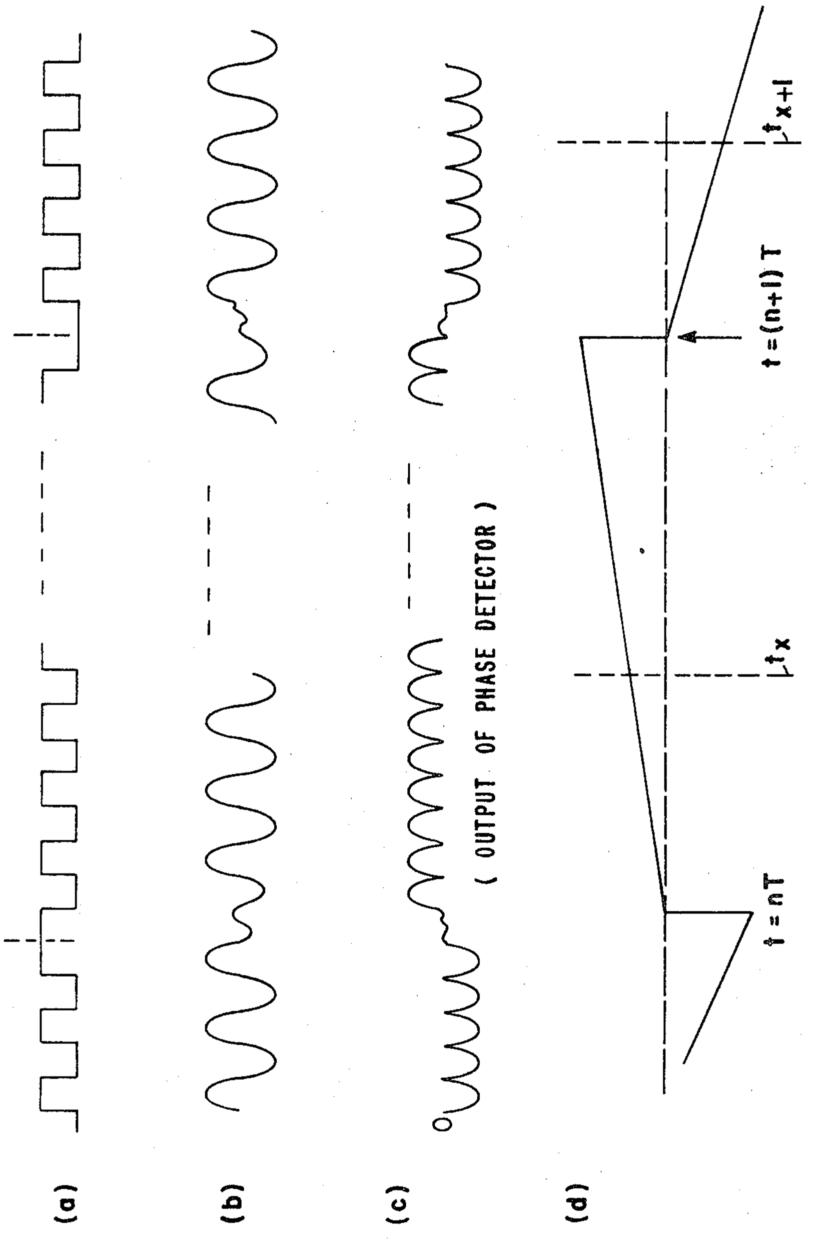
Figure 6:
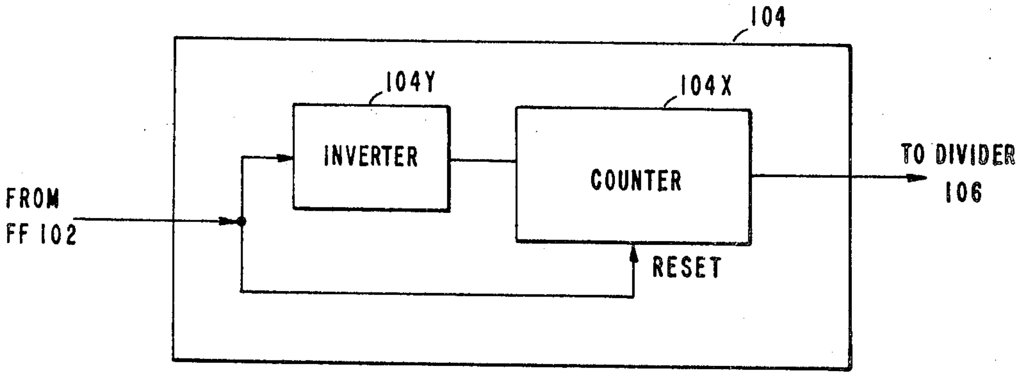
Figure 7:
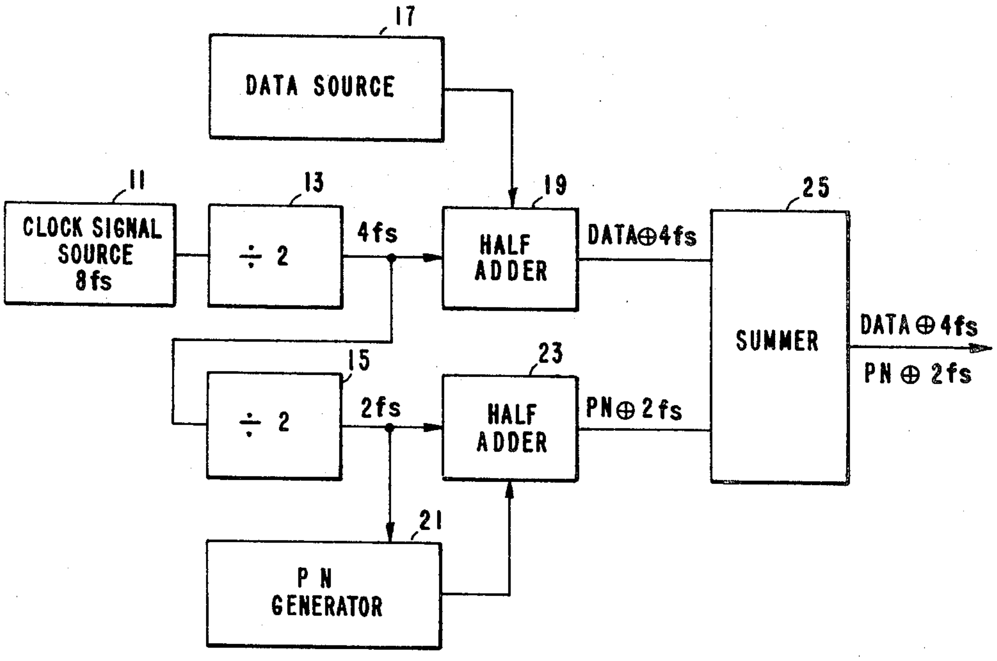

FIGURES 3(*a*) through 3(*g*) are waveform diagrams useful in explaining the input signals to the detection system of the present invention;

FIGURES 4(*a*) and 4(*b*) are diagrams of correlation functions of a binary pseudonoise code and a function $PN \oplus 2f_s$ respectively;

FIGURES 5(*a*) through 5(*d*) are waveform diagrams useful in explaining the operation of a data channel shown in FIGURE 2;

FIGURE 6 is a simplified block diagram of a step-by logic unit shown in FIGURE 2; and FIGURE 7 is a block diagram of a transmitting system for providing the input signals to the detection system of the present invention.

Figure 1:
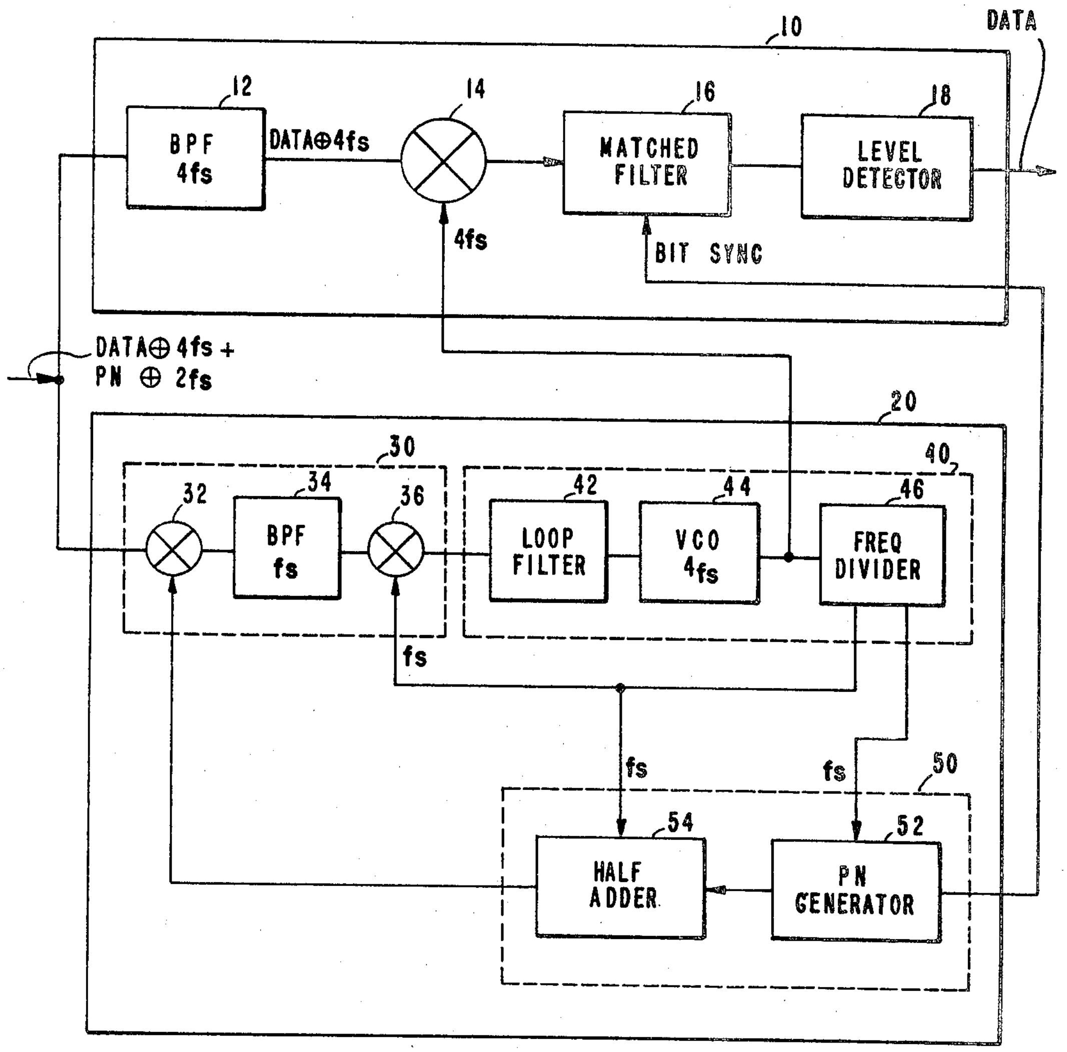
PRIOR ART FIG. 1
FIGURE 1 is a block diagram of a detection system used in the prior art.

For a better understanding of the present invention, reference is first made to FIGURE 1 which is a simplified block diagram of a system for detecting received binary data by using a PN generator to provide synchronizing signals. The arrangement of FIGURE 1 is similar to the detection system shown on page 20 of Jet Propulsion Laboratory Technical Report No. 32–495 herebefore referred to. It is assumed that the input signals comprise a first subcarrier $4f_s$ which is phase modulated by the binary data transmitted from a space vehicle and a second subcarrier $2f_s$ which is code modulated by a PN code from a PN generator in the vehicle. The two signals are designated as $DATA \oplus 4f_s$ and $PN \oplus 2f_s$, where the symbol $\oplus$ indicates that each input signal comprises modulo-2 addition (or addition in a half adder) of two components, such as data and $4f_s$ frequency. Hereafter, the $DATA \oplus 4f_s$ signal will be referred to as the data input signal and the $PN \oplus 2f_s$ signal as the sync input signal.

The detection system at the receiver includes a data channel 10 and a sync channel 20 which are both supplied with the two input signals. The data channel 10 comprises a band pass filter 12 centered at the $4f_s$ frequency. The function of the filter 12 is to separate the data input signal from the sync input signal. The output of filter 12 is supplied to a phase detector 14 wherein the data input signal is coherently demodulated and passed therefrom to a matched filter 16. The matched filter, which is basically an integrator with a sample and discharge configuration, is extensively described in the references herebefore and hereafter referred to. Its output is supplied to a level detector 18, the output of which represents the desired binary data. A limiter and a second band pass filter centered at $4f_s$ may be interposed between filter 12 and detector 14 in order to limit the dynamic range of the detector 14.

As is appreciated by those familiar in the art, for proper coherent demodulation it is necessary to provide detector 14 with a $4f_s$ signal which is in phase with the data subcarrier $4f_s$. In addition, the matched filter 16 must be actuated by a synchronizing pulse, hereafter referred to as bit sync, which is related to a bit sync used in the space vehicle to synchronize the data transmitted. These synchronizing signals are provided in the detection system by the sync channel 20 which includes a correlating stage 30, a phase locked loop 40 and a PN generating stage 50. The correlating stage 30 includes a phase detector 32 to which the two input signals $DATA \oplus 4f_s$ and $PN \oplus 2f_s$ are supplied as well as a signal $PN \oplus f_s$ provided from stage 50. The output of the phase detector is then the cross correlation between $PN \oplus 2f_s$ from the space vehicle and $PN \oplus f_s$ from the stage 50, and can be represented as $f_s$ at 90° or $f_s \angle 90°$ when the two PN codes are aligned, i.e., the two PN generators are synchronized. This signal is then filtered in a band pass filter 34 centered at $f_s$. Therefrom, the signal ($f_s \angle 90°$) is supplied to a second phase detector 36 which is also provided with a signal $f_s$ from the phase locked loop stage 40.

The output signal which represents an error signal or lack of alignment between the two PN codes is supplied to the phase locked loop stage 40 which includes a loop filter 42, a voltage controlled oscillator 44 and frequency dividers 46. The dividers 46 are connected to a PN generator 52 to supply it with a $2f_s$ clock signal when the VCO is set at $4f_s$. Also the dividers 46 provide the $f_s$ clock signal to detector 36 and to a half adder 54 which is also provided with the PN code from generator 52 to supply the $PN \oplus f_s$ signal to detector 32.

Synchronism between the two PN codes is accomplished by an operator manually adjusting the VCO 44 so that a frequency difference $\Delta f$ is introduced between the $4f_s$ of the VCO and that of the received data subcarrier $4f_s$. Consequently, the two codes drift in time relative to one another until the two codes are sufficiently aligned so that the cross correlation is nonzero whereupon the phase locked loop will lock-in and maintain the PN generator in the space vehicle. However this can only be accomplished by a trained operator who must adjust the frequency difference $\Delta f$ and watch the performance of the system until phase lock is attained.

Reference is now made to FIGURE 2 which is a simplified block diagram of the detection system of the present invention in which synchronization is automatically accomplished in a novel manner as hereafter described. The detection system is assumed to receive two input signals which, as in the prior art, comprise a data input signal $DATA \oplus 4f_s$ added to a sync input signal $PN \oplus 2f_s$. The manner in which these signals are derived in a space vehicle is best explained in conjunction with FIGURES 3(*a*) through 3(*g*) and FIGURE 7 which is a block diagram of a transmitting system related thereto. FIGURE 3(*a*) represents an $8f_s$ clock signal which is available in the vehicle from a source 11 (FIGURE 7). The $8f_s$ signal is divided into a $4f_s$ clock signal [FIGURE 3(*b*)] by a divider 13 and a $2f_s$ signal [FIGURE 3(*e*)] by a divider 15. The $4f_s$ signal is combined with a binary data signal [FIGURE 3(*c*)] from a data source 17 in a half adder 19, to produce the signal $DATA \oplus 4f_s$ [FIGURE 3(*d*)] which can also be designated as $\pm 4f_s$. It is assumed that the $4f_s$ in phase represents a "1" and the $4f_s \angle 180°$ (out of phase) is a "0." Similarly, a PN code [FIGURE 3(*f*)] from a PN generator 21 is combined in a half adder 23 to produce the signal $PN \oplus 2f_s$ shown in FIGURE 3(*g*).

The two input signals which are summed up in a summer 25 are transmitted to the detection system in the receiver which includes a data channel 10 (FIGURE 2), similar to that hereinbefore described in conjunction with prior art, with like elements being designated by like numerals. However, whereas in the prior art system, the $4f_s$ data subcarrier has been used only to derive the data therefrom, in the present invention, the data input signal ($DATA \oplus 4f_s = \pm 4f_s$), after being filtered in the band pass filter 12, centered at $4f_s$ (to filter out the sync input signal $PN \oplus 2f_s$) is used to drive a square law detector 62 of a clock reconstructing stage 60. The input signal $\pm 4f_s$ (assuming $4f_s$ is a cosine function) is squared in detector 62 to provide an output which is $8f_s \angle 90°$ plus a DC component $(\pm \cos 2\pi \cdot 4f_s t)^2 = \frac{1}{2} \sin 2\pi \cdot 8f_s t + \frac{1}{2}$.

The output of the square law detector 62 passes through a band pass filter 64 (centered at $8f_s$). The resulting $8f_s$ sine wave which may be limited by a limiter (not shown) to reduce the dynamic range, is applied to a phase locked loop **60*x* which comprises a phase detector 66, a loop filter 67**, and a VCO set initially at $8f_s$. The operation of the phase locked loop has herebefore been mentioned and is extensively described in the literature, including a description starting on page 13 of the Jet Propulsion Laboratory Technical Report No. 32–495. Another reference for the theory and operation of phase locked loops is a paper by L. Jaffe and E. Rechtin, entitled "Design and Performance of Phase-Lock Circuits Capable of Near-Optimum Performance Over a Wide Range of Input Signal and Noise Levels," IRE Transactions on Information Theory, PGIT, volume IT–1, No. 1, March 1955.

It should be appreciated by those familiar with the art, that the output of VCO 68 is an $8f_s$ signal which has the same frequency and phase (modulo $2\pi$) as the $8f_s$ clock signal in the spacecraft [see FIGURE 3(*a*)]. Thus, the original clock signal, used to produce the $4f_s$ and $2f_s$ clock signals which were then modulated by the data and PN code respectively, is available on the ground. The $8f_s$ output of the VCO 68 as will be explained hereafter is used as the basic clock signal for deriving the necessary synchronizing signals.

As seen from FIGURE 2, the detection system includes, in addition to the data channel 10 and clock reconstructing stage 60, a novel sync channel 80 having a phase detector 82 to which the input signal $$(DATA \oplus 4f_s + PN \oplus 2f_s)$$

is applied. In addition, a PN⊕$4f_s$ clock signal is supplied to the detector 82 from a half adder 86. The operation of the detector 82 may be described mathematically by the expression, $PN \oplus 4f_s \oplus \{PN \oplus 2f_s + DATA \oplus 4f_s\}$, which equals $PN \oplus PN \oplus 4f_s \oplus 2f_s + PN \oplus DATA \oplus 4f_s \oplus 4f_s$. The last two terms may also be expressed as PN⊕PN⊕$2f_s$ $\angle 90$ and PN⊕DATA. Thus, it may be stated that the output of the phase detector 82 is $2f_s \angle 90$ of maximum amplitude when the incoming and local PN codes are aligned or in synchronism. In addition, the output of the detector includes a term PN⊕DATA which represents interference between the data and synchronizing (or PN) channels. By mathematical analysis, it can be shown that the power spectrum of the PN⊕DATA signal has a null at the $2f_s$ frequency. Thus, the output of phase detector 82 is filtered in a band pass filter 84 (centered at $2f_s$) in order to remove the interference signal PN⊕DATA. The output of the filter 84 may be limited by a liimter (not shown) in order to limit the dynamic range, and is then multiplied in a phase detector 88 by a local clock signal $2f_s \angle 90$ provided from a converter or phase shifter 92.

Considering the two signals PN⊕$4f_s$ and $2f_s \angle 90$ with which the sync input signal is multiplied (in detectors 82 and 88), the two signals can be expressed as $$PN \oplus 4f_s \oplus 2f_s \angle 90 = PN \oplus 2f_s$$

which is the same as the sync input signal. Thus, it is seen that the output of detector 88 is the autocorrelation function of PN⊕$2f_s$, which is analogous to the autocorrelation function of a PN code.

Reference is now made to FIGURE 4(*a*) which is an autocorrelation function of a PN code. Autocorrelation is the measure of the similarity between a code and any cyclic permutation of the same code, and can be defined as $$R(\tau) = \text{Average } \{PN \oplus PN(\tau)\}/L$$

where $\tau$ is the measure of cyclic permutation, L is the length of the code, and the symbol ⊕ denotes the modulo-2 sum. Obviously, $R(\tau)=1$ only when $\tau=0$ since no cyclic permutation of the PN code can be in perfect agreement with the code. For all other $\tau$, the autocorrelation function may take the form, $$R(\tau) = \frac{(\text{Number of "0's"} - \text{number of "1's"})}{(\text{Number of "0's"} + \text{number of "1's"})}$$

for PN⊕PN($\tau$). The number of 1's in a PN code is $2^N/2$ and the number of 0's is $(2^N-2)/2$. Since PN⊕PN($\tau$) equals PN($\tau'$) (that is to say the modulo-2 sum of the PN code and any specified cyclic permutation of the code provides a cyclic permutation which is not the specified cyclic permutation) and inasmuch as the code possesses the cycle and add property, it can be concluded that, $$R(\tau') = [2^N-2)/2 - 2^N/2]/L = -1/L$$

Thus, the autocorrelation for the PN code is $+1$ for $\tau=0$, and $-1/L$ for all other $1 \leqslant \tau \leqslant L-1$. For the code PN⊕$2f_S$, however, the autocorrelation at $\tau=0$ is $+1$. At $\frac{1}{2} = \tau = L - \frac{1}{2}$ the autocorrelation is $-\frac{1}{2}$. At $$\tfrac{1}{4} = \tau = L - \tfrac{1}{4}$$

the autocorrelation drops to a value of $+\frac{1}{4}$ and at all other values of $\tau$ it is zero. FIGURE 4(*b*) is a diagram of the autocorrelation function of PN⊕$2f_S$.

From the foregoing description, it should be appreciated that the output of the phase detector 88 exceeds an autocorrelation value of $+\frac{1}{4}$ only if the two PN codes are aligned or synchronized. Thus, the output of the detector 88 is an indication of the synchronization of the two PN codes. This output is applied to a matched filter 94, or reset integrator, which is reset by a word sync clock signal produced at the end of each code period from a PN generator 96. The filter is biased such that a positive output exists only at the maximum $$[\text{i.e., } R(\tau)=1]$$

in the autocorrelation between the received and the PN codes. The output of the reset integrator is applied to a level detector 98 which in turn steers (sets) a flip-flop (FF) 102 which supplies an in-lock signal to a step-by logic unit 104 when the integrator output is positive, i.e., when the two codes are synchronized.

From the foregoing description of FIGURES 3(*a*), 3(*e*), 3(*f*), and 3(*g*), it should be recalled that, in the space vehicle, an $8f_S$ clock signal is divided down to a $2f_S$ signal [FIGURE 3(*e*)] which is then used to clock the PN generator therein. Thus each $8f_S$ cycle represents one-quarter code bit. In the detection system on the ground, the $8f_S$ clock signal produced by the VCO 68 (FIGURE 2) is divided down by serially connected frequency dividers 106 and 108, having outputs of $4f_S$ and $2f_S$, respectively. The output of divider 108 is used to clock the PN generator 96 at a frequency of $2f_S$, i.e., one $2f_S$ cycle per bit.

The PN generator 96 provides bit sync pulses to the matched filter 16 as herebefore described. The generator also provides a word sync clock signal to the matched filter 94 which integrates, during each complete code period, the output of detector 88, i.e., the signal representing the correlation between the two PN codes. If the two codes are not aligned, i.e., $\frac{1}{4} \leqslant \tau \leqslant L - \frac{1}{4}$, then the output of the filter will not cause FF 102 to provide the logic unit 104 with an in-lock signal. Unit 104 is designed to supply frequency divider 106 with a pulse in the absence of an in-lock signal from FF 102. This pulse steps the PN generator by ¼ code bit.

In the absence of correlation at the end of each code period, the PN generator 96 is stepped by one-quarter code bit with respect to the PN generator in the space vehicle. The stepping of the generator 96 by one-quarter code bit per code period is continued until the two codes are aligned, at which time an in-lock signal is provided by FF 102 so that the logic unit does not supply additional pulses to divider 106. Thereafter, only the $8f_S$ signal from VCO 68 is used to clock the generator 96. Recalling that the $8f_S$ from VCO 68 is in sync with the $8f_S$ [FIGURE 3(*a*)] clocking signal in the space vehicle, the two PN generators and the codes thereof will remain synchronized for the rest of the operation.

In one actual reduction to practice, a PN generator of 63 bits was used. Each data bit required 18 cycles of $4f_S$ as shown by reference numerals 201 through 218 in FIGURE 3(*b*). One PN bit was generated per one $2f_S$ cycle as shown by cycle 221 [FIGURE 3(*e*)] with respect to the "0" PN bit 222 [FIGURE 3(*f*)]. Nine PN bits represented one data bit. Since there were 63 PN bits per code period, one code period represented 7 data bit periods or one word period, each comprising of 7 data bits. The bit sync signals from generator 96 were produced after each 9th PN bit and the word sync was produced at the end of each code period (63 PN bit periods). Synchronization was accomplished by sensing the lack of correlation between the two codes, during each code period and producing a pulse in logic unit 104 which is analogous to one $8f_S$ cycle to step divider 106 in order to step the PN generator 96 by one-quarter PN bit. Since the PN generator has 63 bits, it is appreciated that under the worst out of correlation condition, 251 code periods ($63\times4-1=251$) may elapse before synchronization is accomplished. However, at the frequency rates of the $8f_S$ clock signals used in the reduction to practice, the time required for synchronization was very short.

Once synchronization is achieved, the matched filter 16 (FIGURE 2) is provided with synchronized bit sync pulses so that the filter may be properly reset at the end of each bit period to detect the transmitted data. For a better understanding of the significance of resetting the filter at the end of each bit period, reference is made to FIGURE 5(*a*) which is identical with FIGURE 3(*d*), representing the data input signal DATA$\oplus4f_S$. FIGURE 5(*b*) represents the output of band pass filter 12. FIGURE 5(*c*) represents the output of the detector 14 and FIGURE 5(*d*) represents the output of the matched filter reset at times $t_n$ and $t_n+1$, which occur at exactly the end of bit periods. It is the output level of the filter that is used to determine whether the transmitted data is a binary one (output of filter is positive) or a binary zero (output of filter is negative). It should be appreciated that had the bit sync pulses been supplied at erroneous times, such as $t_x$ and $t_x+1$ occurring at mid-bit periods, the integrated output of filter 16 would be of a value which would produce ambiguous output data.

As seen from FIGURE 2, stage 80 includes the step-by logic unit 104, the function of which is to step the generator 96 at a rate of one-quarted code bit until synchronization of the two PN generators is accomplished.

The logic unit may comprise a single inverter stage, so that a pulse is supplied to divider 106 only in the absence of a lock-in pulse from FF 102. The unit may also include circuitry which enhances the probability of keeping the generator 96 in sync with the PN generator in the space vehicle, once synchronization or in-lock has been attained. Basically, the unit may include a counter which functions as a flywheel, inhibiting the stepping of the PN generator 96 (by pulses supplied to divider 106) until a selected number of out-of-lock decisions occur consecutively. In other words, only if in-lock signals from FF 102 are not supplied during several consecutive code periods, indicating lack of correlation during the consecutive periods, does unit 104 provide a step-by pulse. However, if an in-lock signal is supplied indicating that the two generators are in synch, the flywheel counter is reset and the stepping of the PN generator 96 is inhibited.

FIGURE 6 represents a simplified block diagram of the step-by logic unit 104 utilizing a flywheel type counter, function of which has herebefore been described. The unit 104 includes a counter **104*x* which is supplied with signals from the FF 102 through an inverter 104*y*. The counter has a predetermined maximum count, which when reached, supplies a pulse to divider 106 in order to advance the code from generator 96 (FIGURE 2) by one-quarter PN bit. Each pulse from FF 102 (when supplied) resets counter 104*x*. Thus, as long as correlation between the two codes is present, an in-lock pulse from FF 102 resets counter 104*x*. However, if the two codes are not synchronized, the absence of a pulse from 102 causes inverter 104*y* to step counter 104*x* so that when its maximum count is reached, a pulse is supplied to divider 106. Thus, a number (equal to the counter's maximum count) of consecutive lack of correlation periods must occur before a step-by pulse is provided by unit 104**.

From the foregoing description, it should thus be appreciated that unlike prior art systems using coherent PSK techniques with PN code synchronization which require manual supervision, the present invention provides a system which is completely automatic. The system incorporates a clock reconstructing stage (60 in FIGURE 2) to produce an unmodulated clock $8f_s$ which has the same phase ($\pm2\pi$) and frequency as the $8f_s$ clock in the space vehicle. This is accomplished by using a square law detector (62) which eliminates the data component and together with a phase locked loop (**60*x***) provides the $8f_s$ clock. Since both PN generators which are to be synchronized are clocked by a $2f_s$ clock (derived from the $8f_s$ clock), the phase ambiguity has been solved by automatically advancing or retarding the ground PN generator, testing for sync at each end code period, until sync (indicated by the maximum in the autocorrelation of a local replica code with the received sync input signal) is detected.

The correlation process between the received and local synchronizing code has been mechanized so that channel interaction effects are minimized. For example, band pass filter 84 is centered at $2f_s$ at which the power spectrum of DATA⊕PN interference signal has a null, so that the interference is filtered out. The band pass filter 84 (at $2f_s$) is similarly effective in filtering the DATA$\oplus4f_s$ signal which also has a null at the same ($2f_s$) frequency. Similarly, the band pass filter 12 is centered at $4f_s$ to filter out the sync input signal PN$\oplus2f_s$ which has a power spectrum with a null at $4f_s$.

Accordingly, there has been shown and described hereinbefore a novel synchronized digital communication system. It should be appreciated that those familiar with the art may make modifications in the arrangements as shown without departing from the true spirit of the invention. Therefore, all such modifications and equivalents are deemed to fall within the scope of the invention as claimed in the appended claims.

What is claimed is:

1. In a digital data communication system a detection stage for receiving a first clock signal modulated by binary data and a second clock signal modulated by a first cyclic code from a first cyclic code generator to detect said binary data comprising:

clock signal reconstructing means responsive to said modulated first clock signal for providing a third unmodulated clock signal which is related to said first and second clock signals;

a second cyclic code generator;

first means responsive to said third unmodulated clock signal for causing the second cyclic code generator to provide a second cyclic code; and second means responsive to said first means and said second cyclic code for synchronizing said first and second cyclic codes by autocorrelating said second clock signal modulated by said first cyclic code.

2. The apparatus of claim 1 wherein said first and second cyclic code generators are pseudonoise code generators cyclically generating a multibit binary code.

3. The apparatus of claim 2 wherein the frequency of said first clock signal is twice the frequency of said second clock signal and the frequency of said third clock signal is twice the frequency of said first clock signal, said clock reconstructing means including square law detection means for squaring said first clock signal modulated by said data and a phase lock loop, to produce said third clock signal, said first means including frequency dividing means for producing from said third clock signal a fourth clock signal having a frequency substantially equal to said second clock signal.

4. In a digital data communication system wherein binary data is transmitted to a receiving system as a first clock signal modulated by said transmitted binary data and a second clock signal modulated by a first cyclic multibit binary code from a first cyclic multibit binary code generator in a transmitting system which further includes a fundamental clock signal source providing a first fundamental clock signal from which said first and second clock signals are derived, a detection system comprising:

fundamental clock reconstructing means responsive to said modulated first and second clock signals for producing a second fundamental clock signal in phase and of equal frequency with said first fundamental clock signal;

means responsive to said second fundamental clock signal for providing a third clock signal of a frequency equal to the frequency of said second clock signal;

a second cyclic multibit binary code generator responsive to said third clock signal for generating a second cyclic multibit binary code;

means for correlating said first and second cyclic multibit binary codes and producing a signal indicative of the degree of synchronization of said first and second cyclic multibit binary code generators; and means for energizing said second generator with said signal and synchronizing said second generator with said first cyclic multibit binary code generator.

5. The apparatus of claim 4 wherein said first and second cyclic code generators are pseudonoise code generators cyclically generating said first and second multibit binary codes in response to said second and third clock signals respectively.

6. The apparatus of claim 5 wherein said fundamental clock reconstructing means include first detecting means for providing a clock signal having a frequency substantially equal to said first fundamental clock signal and a phase lock loop responsive to said latter-mentioned clock signal for producing said second fundamental clock signal.

7. The apparatus of claim 5 wherein each of said first and second fundamental clock signals equals $8f_s$, said first clock signal equals $4f_s$, said second clock signal equals $2f_s$, said third clock signal equals $2f_s$ said first clock signal modulated by said binary data equals $DATA\oplus 4f_s$, and said second clock signal modulated by said first cyclic binary code equals $PN\oplus 2f_s$, where PN represents said first pseudonoise generator, $\oplus$ represents modulo-2 addition and $f_s$ represents a predetermined frequency.

8. A digital data communication system including a transmitting stage comprising a source of first clock signals of a frequency $8f_s$, means responsive to said $8f_s$ clock signals for providing first signals of $4f_s$ frequency and second signals of a $2f_s$ frequency, a first pseudonoise code generator for cyclically generating a first pseudonoise code in response to said second signal, a source of data bits, and means including half adding means modulating said first $4f_s$ signal with said data bits and providing a data modulated signal $DATA\oplus 4f_s$, and for modulating said second $2f_s$ signal with said first pseudonoise code and providing a code modulated signal $PN\oplus 2f_s$, where PN represents said first pseudonoise code and $\oplus$ represents half adding function, said digital data communication system further including a detecting means of a receiving stage comprising:

clock reconstructing means responsive to said data modulated signal $DATA\oplus 4f_s$ for providing second clock signals of a frequency $8f_s$, in phase with said first $8f_s$ clock signals;

a second pseudonoise code generator substantially identical with said first generator;

frequency dividing means responsive to said second $8f_s$ clock signals for energizing said second code generator with third signals of a $2f_s$ pseudonoise code $PN_2$;

means for autocorrelating said first pseudonoise $PN_1$ code with said second pseudonoise $PN_2$ code and providing a correlation signal indicative of the synchronization of said first and second pseudonoise code generators; and logic control means responsive to said correlation signal for synchronizing said second pseudonoise code generator with said first pseudonoise code generator.

9. The system of claim 8 wherein said clock reconstructing means comprise square law detecting means for removing the data in said data modulated signal $DATA\oplus 4f_s$ and squaring the $4f_s$ component thereof to provide an output signal of an $8f_s$ frequency and a phase lock loop including phase detecting means and a voltage control oscillator responsive to said $8f_s$ output signal for producing said second $8f_s$ clock signals in phase with said first $8f_s$ clock signals in said transmitting stage.

10. The system of claim 9 wherein said frequency dividing means include means for producing fourth signals of $4f_s$ frequency in response to said second $8f_s$ clock signal and said means for autocorrelating including half adding means responsive to said second $PN_2$ pseudonoise code and said fourth $4f_s$ signals for providing a second code modulated signal $PN_2\oplus 4f_s$;

means for providing $2f_s\ \angle 90$ signals which are 90° out of phase with respect to said third $2f_s$ signals and phase detecting means responsive to said second code modulated signal $PN_2\oplus 4f_s$, said $2f_s\ \angle 90$ signals and said code modulated signal $PN_1\oplus 2f_s$ for producing said correlation signal.

11. The system of claim 10 wherein said logic control means include resettable counting means for controlling the synchronizing of said second pseudonoise code generator only after a predetermined number of consecutive correlation signals indicative of lack of synchronization between the two generators are received.

12. The system of claim 10 further including data detection means responsive to said data modulated signal $DATA\oplus 4f_s$ and synchronizing signals from said fourth $4f_s$ signals produced by said frequency dividing means and bit synchronizing signals from said second pseudonoise code generator for demodulating said $$DATA\oplus 4f_s$$

signals to detect the data bits therein.

13. The system of claim 10 wherein each of said pseudonoise codes comprises $yx/2$ code bits, $y$ being equal to the number of data bits per data word, $x$ representing the number of cycles of $4f_s$ signals per data bit, whereby said second pseudonoise code generator provides $y$ bit synchronizing signals during each code period.

14. The system of claim 13 wherein $y=7$ and $x=18$ whereby the pseudonoise code length is 63, with nine code bits being generated for each data bit.

15. In a digital data communication system including a source for serially providing data bits, each group of Y bits comprising a data word;

a source of first clock signals of a frequency $8f_s$;

means for deriving second clock signals of a frequency $4f_s$ and third clock signals of a frequency $2f_s$ from said first clock signals;

means for modulating said second clock signals with data bits from said source whereby the phase of each $x$ of said second clock signals is controlled as a function of a data bit to provide a data modulated signal definable by the expression $DATA\oplus 4f_s$, where $\oplus$ represent a half addition function;

a first pseudonoise code generator for cyclically generating in response to said third clock signals a first multibit binary code of Z code bits, Z being equal to $YX/2$;

means for modulating said third clock signals with said multibit binary code and providing a code modulated signal definable by the expression $$PN_1\oplus 2f_s$$

where $PN_1$ represent the code of said first generator, the phase of each of said third clock signals being controlled as a function of another code bit;

means for receiving said data and code modulated signals and separating said data modulated signal from said code modulated signal;

square law detecting means responsive to said data modulated signal for providing fourth unmodulated clock signals of said frequency $8f_s$;

phase lock loop responsive to said fourth unmodulated clock signals for providing fifth unmodulated clock signals of said frequency $8f_s$, said first and fifth clock signals being in phase;

means dividing said fifth clock signals for providing sixth clock signals of a frequency $4f_s$ and seventh clock signals of a frequency $2f_s$;

a second pseudonoise code generator for cyclically generating in response to said seventh clock signals a second multibit code of Z code bits represented by $PN_2$;

half adding means for modulating said second multibit code $PN_2$ with said sixth clock signals and providing a second code modulated signal $PN_2 \oplus 4f_s$;

means for providing eighth clock signals represented by $2f_s \angle 90$ which are 90° out of phase with said seventh clock signals;

correlating means for correlating said code modulated signal $PN_1 \oplus 2f_s$ with said second code modulated signal $PN_2 \oplus 4f_s$ and said eighth clock signals and determining the degree of correlation between said first and second codes by providing correlation signals related thereto;

synchronizing means for utilizing said correlation signals to synchronize said first and second pseudonoise code generators; and means utilizing Y bit synchronizing signals from said second code generator during each code period for demodulating said data modulated signal to detect Y data bits therein.

16. The system as recited in claim 15 wherein said correlating means further include resetting integrator means and means for resetting said integrator means with an end of code period signal from said second code generator.

17. The system of claim 16 wherein said synchronizing means include counting means for shifting the code of said second generator with respect to the code of said first generator only after being energized by a consecutive series of correlation signals indicative of lack of correlation between said first and second codes.

References Cited

UNITED STATES PATENTS

| | | | |
|---|---|---|---|
| 3,305,636 | 2/1967 | Webb | 178—67 |
| 3,337,803 | 8/1967 | Costas et al. | 178—68 X |

ROBERT L. GRIFFIN, *Primary Examiner.*

J. T. STRATMAN, *Assistant Examiner.*